United States Patent
Aslan et al.

(10) Patent No.: US 8,021,042 B1
(45) Date of Patent: Sep. 20, 2011

(54) BETA VARIATION CANCELLATION IN TEMPERATURE SENSORS

(75) Inventors: Mehmet Aslan, Sunnyvale, CA (US); John W. Branch, Seattle, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/803,289

(22) Filed: Jun. 23, 2010

Related U.S. Application Data

(60) Division of application No. 12/284,501, filed on Sep. 23, 2008, now Pat. No. 7,766,546, which is a continuation of application No. 10/865,609, filed on Jun. 9, 2004, now abandoned.

(51) Int. Cl.
*G01K 7/00* (2006.01)
*H01L 31/00* (2006.01)

(52) U.S. Cl. ................ 374/178; 327/512
(58) Field of Classification Search .......... 374/178; 327/512
See application file for complete search history.

(56) References Cited

U.S. PATENT DOCUMENTS

| | | | | |
|---|---|---|---|---|
| 5,195,827 | A * | 3/1993 | Audy et al. | 374/172 |
| 7,010,440 | B1 * | 3/2006 | Lillis et al. | 702/65 |
| 7,170,334 | B2 * | 1/2007 | Miranda et al. | 327/512 |
| 7,237,951 | B2 * | 7/2007 | Cave | 374/178 |
| 7,261,974 | B2 * | 8/2007 | Watanabe et al. | 429/120 |
| 7,332,952 | B2 * | 2/2008 | McLeod et al. | 327/512 |
| 7,333,038 | B1 * | 2/2008 | Aslan | 341/120 |
| 7,766,546 | B1 * | 8/2010 | Aslan et al. | 374/178 |

* cited by examiner

*Primary Examiner* — Lisa Caputo
*Assistant Examiner* — Mirellys Jagan
(74) *Attorney, Agent, or Firm* — Girard & Equitz LLP

(57) ABSTRACT

An apparatus and method for canceling variations in the beta for a bipolar junction transistor so that the diode equation can be employed to accurately measure the temperature of the transistor based at least in part on a ratio of two target collector currents and two measurements of the base-emitter voltage of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determined collector current to be relatively equivalent to the first and second target collector currents. Additionally, the transistor can be remotely located in another integrated circuit.

83 Claims, 12 Drawing Sheets

BETA VARIATION CANCELLATION IN TEMPERATURE SENSORS

CROSS-REFERENCE TO RELATED APPLICATIONS

This utility patent application is a divisional of U.S. patent application Ser. No. 12/284,501 filed on Sep. 23, 2008 now U.S. Pat. No. 7,766,546 which is a continuation of U.S. patent application Ser. No. 10/865,609, filed Jun. 9, 2004, now abandoned the benefits of which are both hereby claimed under 35 U.S.C. Section 120 and the contents of which are both fully incorporated herein by reference.

FIELD OF THE INVENTION

The invention is generally directed to the measuring the temperature of an electronic device, and more particularly, to improving the accuracy of measuring a temperature signal provided by a transistor disposed in an electronic device.

BACKGROUND OF THE INVENTION

An electronic temperature sensor circuit can be arranged to measure the temperature on a remote (separate) silicon chip by providing one or more known currents to a p-n junction located on the remote chip. This circuit measures a diode voltage of this p-n junction and processes the diode voltage to determine the actual temperature at the remote location. Most p-n junctions employed for this purpose are parasitic vertical p-n-p silicon based transistors. Also, the temperature sensor circuit is usually arranged to control the emitter currents of the transistor.

The classic diode equation is often employed to determine the actual temperature at the remotely located p-n-p transistor based on a ratio of approximated collector currents. So long as the emitter current and collector current are substantially equivalent for this remotely located transistor, the determined temperature can be relatively accurate. However, if the beta (ratio of collector current over base current) of the p-n-p transistor varies with a varying emitter current, a determined temperature based on the diode equation can be less accurate. Recently, process variations and the ever shrinking physical size of process geometries for silicon devices are causing the beta to vary significantly with a varying emitter current.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
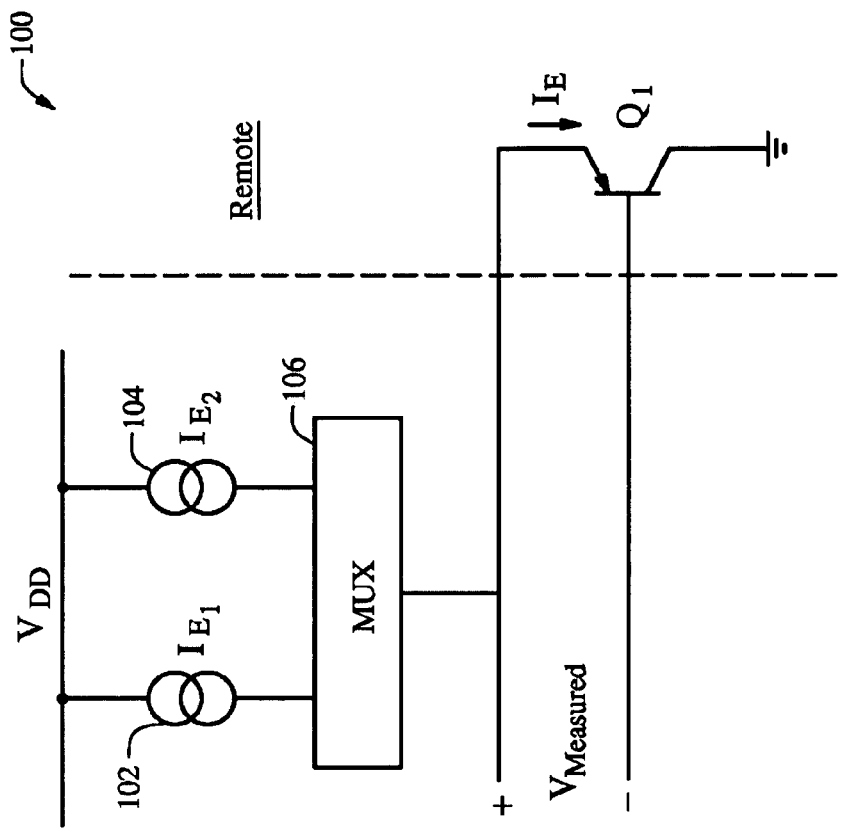
FIG. 1 illustrates a schematic diagram of an exemplary circuit that provides two known emitter currents for a remotely located transistor.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to an apparatus and method for canceling variations in the beta for a transistor so that the diode equation can be employed to accurately measure the temperature of the transistor based at least in part on a ratio of two target collector currents (Ictarget1, Ictarget2) and two measurements of the base-emitter voltage (Vbe1, Vbe2) of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determined collector current to be relatively equivalent to the first and second target collector currents. Additionally, the transistor whose currents are measured/determined to determine its temperature can be remotely located in another integrated circuit (chip) or disposed in the same integrated circuit as the invention.

The classic diode equation determines a change in the base emitter voltage (ΔVbe) for a p-n-p transistor as follows:

$$\Delta Vbe = \eta \frac{\kappa T}{q} \ln\left(\frac{Ic1}{Ic2}\right) \quad \text{Equation 1}$$

where η is a non-ideality constant substantially equivalent to 1.00 or slightly more/less, κ is the well known boltzmann's constant, q is the electron charge, T is the temperature in Kelvin, Ic1 is a first collector current, and Ic2 is a second collector current that are present at the measurement of a first base-emitter voltage and a second base-emitter voltage.

In the past, since a ratio of collector currents tended to be relatively equivalent to a ratio of known emitter currents (Ie), the diode equation could be accurately approximated in a rewritten form that follows:

$$T = \Delta Vbe \Big/ \left(\eta \frac{\kappa}{q} \ln\left(\frac{Ie1}{Ie2}\right)\right) \text{ where } \frac{Ic1}{Ic2} = \frac{Ie1}{Ie2}; \quad \text{Equation 2}$$

However, due in part to process variations for integrated circuits with smaller process geometries, the assumption regarding relatively equivalent ratios may no longer be valid. The beta (ratio of collector current over base current) has been shown to vary as much as 10 percent or more between two known emitter currents for p-n-p transistors in integrated circuits manufactured from relatively smaller process geometries.

In an exemplary integrated circuit based on a smaller die size, a beta of 0.77 was measured for a 10 microamp emitter current provided to a transistor. For the same transistor, the measured beta was 0.83 when the emitter current was changed to 170 microamps. Thus, the diode equation approximation (Equation 2) regarding the ratios of collector and emitter currents for a transistor can cause relatively inaccurate temperature measurements in an integrated circuit based on smaller process geometries. Relatively significant inaccurate temperature measurements can occur in integrated circuits that have process geometries of 90 nanometers or less.

The invention provides for a more accurate temperature measurement for a transistor with a rewritten form of the diode equation (Equation 3) that provides for actually measuring or controlling the ratio of collector currents instead of the ratio of emitter currents.

$$T = \Delta Vbe \Big/ \left(\eta \frac{\kappa}{q} \ln\left(\frac{Ic1}{Ic2}\right)\right) \quad \text{Equation 3}$$

FIG. 1 illustrates a schematic diagram of overview 100 for an exemplary circuit that provides two known emitter currents for a remotely located p-n-p transistor (Q1). Current sources 102 and 104 are separately coupled between a voltage source (Vdd) and multiplexer 106. As each current source is selected, it provides a known emitter current to the remotely located transistor Q1. The provided emitter currents induce base-emitter voltages across the transistor that can be measured (Vmeasured) and employed to determine the temperature based on an approximation of the diode equation (Equation 2).

Figure 2:
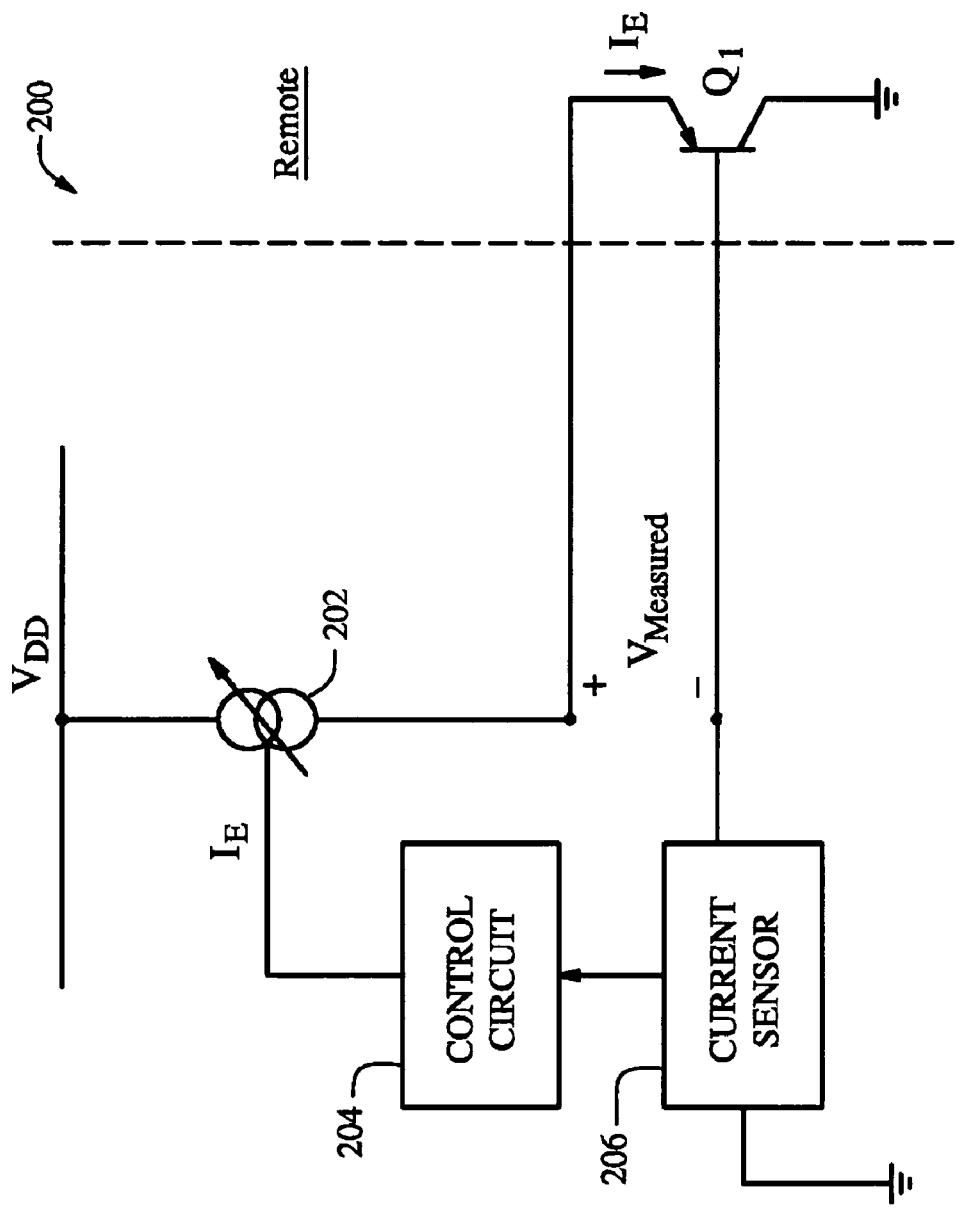
FIG. 2 shows a schematic diagram of an exemplary circuit for determining collector currents for a remotely located transistor.

FIG. 2 shows a schematic diagram of general overview 200 of components for determining collector currents for a remotely located transistor Q1. Current sensor 206 is coupled to the base of transistor Q1 where it is employed to measure the base current of this transistor. Current sensor 206 provides the measured base current to control circuit 204 which in turn controls the operation of variable current source 202. For two separate ranges of emitter current, the variable current source is varied so that the determination of the collector current (Icurrent=Iemitter−Ibase) is equivalent to a first target (predetermined) collector current and a second target collector current. The base-emitter voltage (Vmeasured) for the remotely located transistor Q1 is measured when the determined collector current is equivalent to one of the target collector currents. The arrangement of these components enable the temperature for a remotely located transistor to be determined based on an actual ratio of predetermined target collector currents, not an approximation. Additionally, substantially the same arrangement of these components could be employed to determine the temperature of a transistor that was disposed locally, i.e., the transistor can be disposed in the same integrated circuit as the components employed to measure its currents.

Figure 3A:
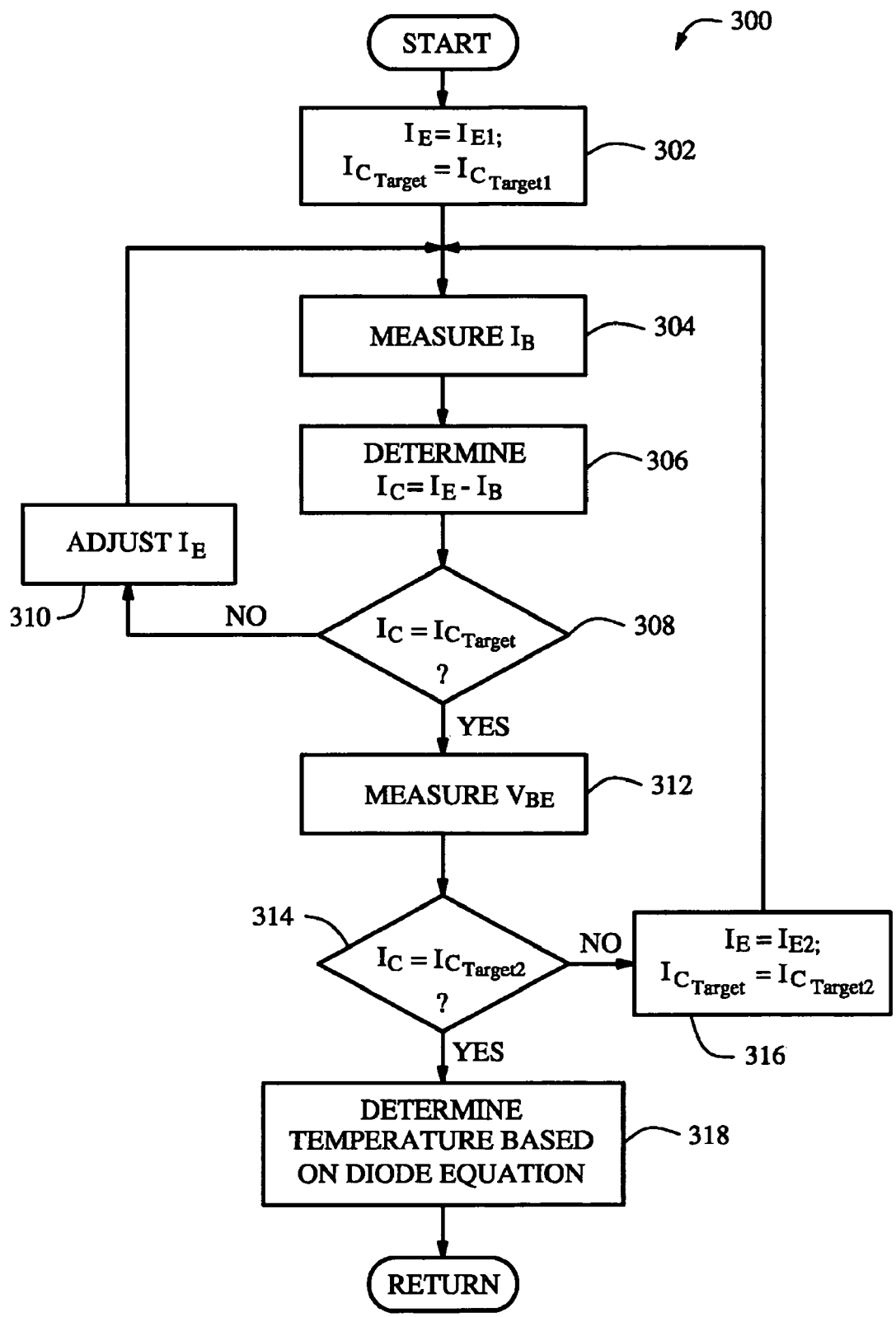
FIG. 3A illustrates a flow chart for determining the temperature of a remotely located transistor based on separate measurements of its base-emitter voltage for two determined target collector currents.

FIG. 3A illustrates a flow chart for determining the temperature of a remotely located transistor based on separate measurements of its base-emitter voltage for two iteratively determined target collector currents. Moving from a start block, the process steps to block 302 where the emitter current provided to the remotely located transistor is adjusted to a first value. Also, a first target value is provided for comparing to a determined collector current. At block 304, the base current for the remotely located transistor is measured. Flowing to block 306, the collector current is determined by the difference between the first value of the emitter current and the measured base current, i.e., Ic=Ie−Ib. Advancing to decision block 308, a determination is made as to whether or not the determined collector current is equivalent to the first target value. If false, the process moves to block 310 where the emitter current is adjusted. Next, the process returns to block 304 and performs substantially the same actions discussed above. This process substantially loops until the determined collector current is relatively equivalent to the first target value.

If the determination at decision block 308 had been true, the process would have stepped to block 312 where the base-emitter voltage of the remotely located transistor for the first target value would be measured and stored. Moving to decision block 314, another determination is made as to whether or not the value of the determined collector current is equivalent to a second target value. If false, the process steps to block 316 where the second target value is provided for comparing to the determined collector current. The process returns to block 304 and performs substantially the same actions discussed above except for the second target value.

Once the determination at decision block 314 is true, the process moves to block 318 where the diode equation (discussed above) is employed to determine the temperature of the remotely located transistor based on the measured base-emitter voltages for two predetermined (target) values for the collector currents. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 3B:
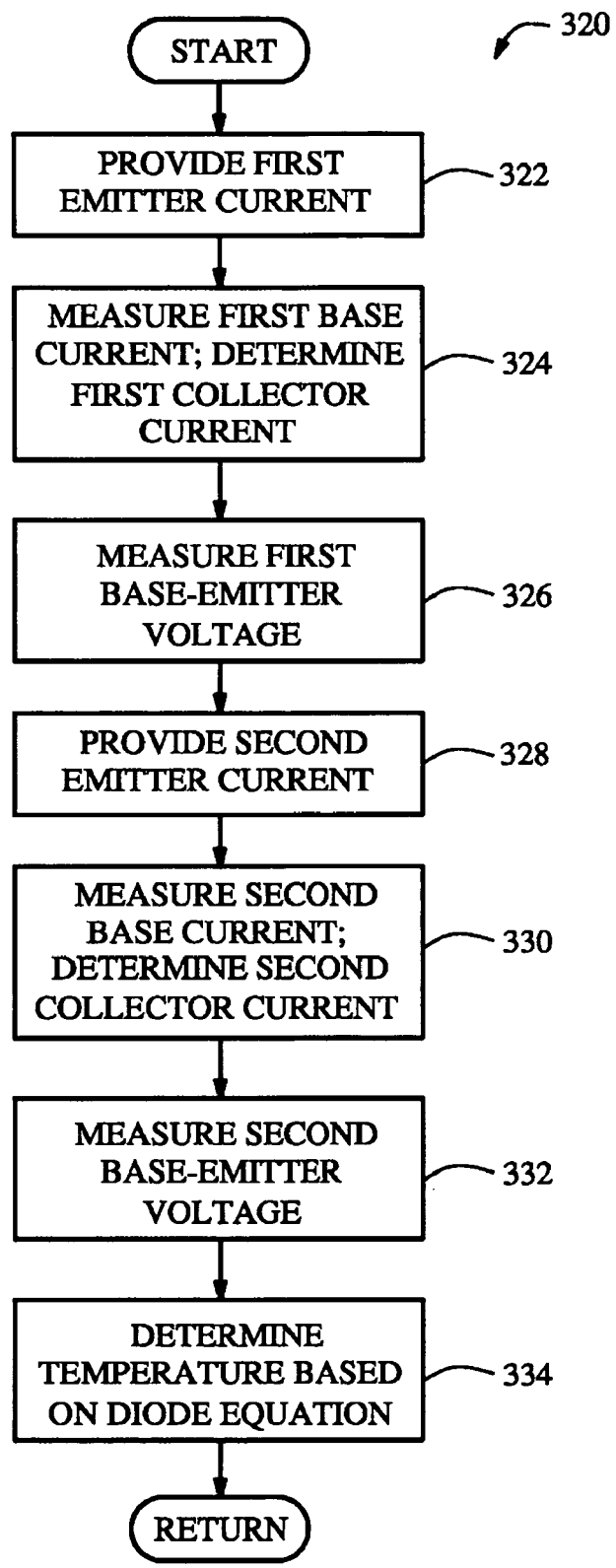
FIG. 3B illustrates a flow chart for determining the temperature of a remotely located transistor based on separate measurements of its base-emitter voltage for two determined collector currents.

FIG. 3B illustrates a flow chart for determining the temperature of a remotely located transistor based on separate measurements of its base-emitter voltage for two determined collector currents. Moving from a start block, the process steps to block 322 where a first emitter current that has a known value, e.g., "X" milliamps, is provided to the remotely located transistor. At block 324, a first base current is measured. Also, the known first emitter current and the measured first base current are employed to determine a first collector current, i.e., the collector current is equivalent to the emitter current minus the base current. Moving to block 326, the process measures a first base-emitter voltage for the transistor.

Next, the process advances to block 328 where a second emitter current that has a known value, e.g., "Y" milliamps, is provided to the remotely located transistor. At block 330, a second base current is measured. Also, the known second emitter current and the measured first base current are employed to determine a second collector current. Stepping to block 332, the process measures a second base-emitter voltage for the transistor. Flowing to block 334, the process employs the diode equation to determine the temperature of the transistor which is based in part on a ratio of the determined first and second collector currents and the difference between the first and second measured base-emitter voltage. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 4A:
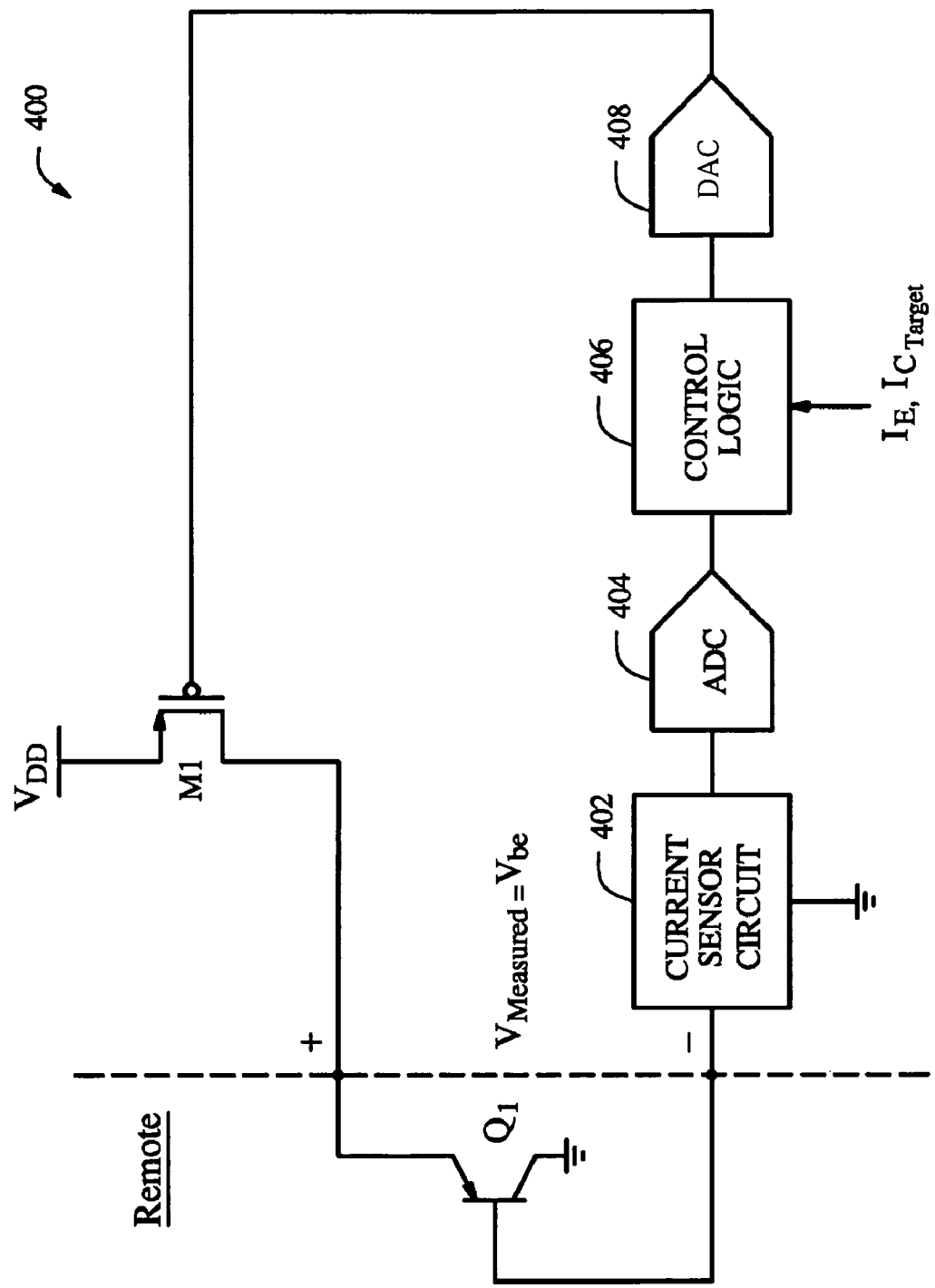
FIG. 4A illustrates a schematic diagram of an exemplary circuit that employs digital components to determine target collector currents for a remotely located transistor.

FIG. 4A illustrates a schematic diagram of overview 400 for employing digital components to determine collector currents for a remotely located transistor Q1 in accordance with the process discussed above for FIG. 3A. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to control logic 406. Also, control logic 406 receives a value of the emitter current presently provided to transistor Q1 and a target value (first or second) for the determined collector current.

Control logic 406 is coupled to digital-to-analog converter (DAC) 408 and provides a digital signal to the DAC to increase, decrease, or remain constant in regard to the emitter current for transistor Q1. The analog output signal from DAC 408 is coupled to the gate of MOSFET M1 which in turn provides the emitter current to transistor Q1. Changes in the analog signal output of DAC 408 causes MOSFET M1 to either increase or decrease the emitter current provided to transistor Q1. Additionally, substantially the same arrangement of these components in FIG. 4A could be employed to determine the temperature of a transistor that is disposed locally, i.e., the transistor can be disposed in the same integrated circuit as the components employed to measure its currents.

Figure 4B:
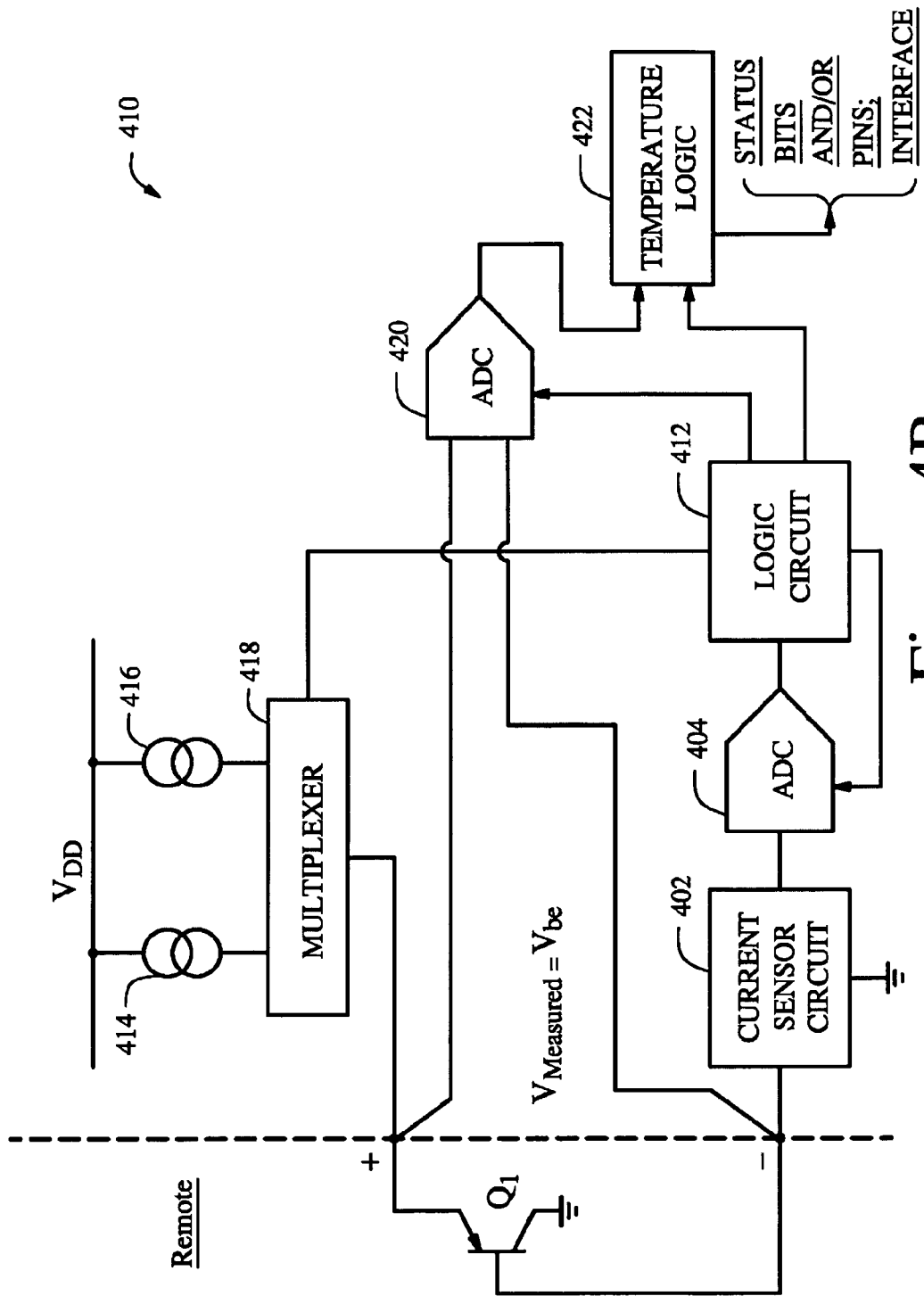
FIG. 4B shows a schematic diagram of an exemplary circuit that employs digital components to determine collector currents for a remotely located transistor.

FIG. 4B illustrates a schematic diagram of overview 410 for employing digital components to determine collector currents for a remotely located transistor Q1 in accordance with a process discussed above for FIG. 3B. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to logic circuit 412. An output of logic circuit 412 is coupled back to ADC 404 to save power by de-energizing the ADC if it is not actively employed to measure the base current. Known emitter currents are separately provide to transistor Q1 by current sources 414 and 416 through multiplexer 418. An analog-to-digital converter (ADC) 420 is coupled across the base and emitter of the remotely located transistor Q1 for measuring the transistor's base-emitter voltage. Another output of logic circuit 412 is coupled to ADC 420 to save power by de-energizing this ADC if it is not actively employed to measure the base-emitter voltage current. The output of ADC 420 and another output of logic circuit 412 are coupled to temperature logic 422 to determine the temperature of transistor Q1 and provide a representation of the determined temperature with status bit(s), pin(s) serial interface(s), parallel interface(s) bus(es), and the like.

In one embodiment, the resolution for ADC 404 to measure the base current might be configured to be substantially less than the resolution of ADC 420 to measure the base-emitter voltage of transistor Q1. Also, since the first and second determined collector currents are employed to determine temperature, gain correction is automatically provided for measuring the base-emitter voltage of the transistor Q1, i.e., increase, decrease, or remain constant based on the determined collector current of the transistor. Also, in yet another embodiment, a variable current source could be employed to perform substantially the same actions as current sources 414 and 416 and multiplexer 418.

Additionally, substantially the same arrangement of these components in FIG. 4B could be employed to determine the temperature of a transistor that is disposed locally, i.e., the transistor can be disposed in the same integrated circuit as the components employed to measure its currents.

Figure 5:
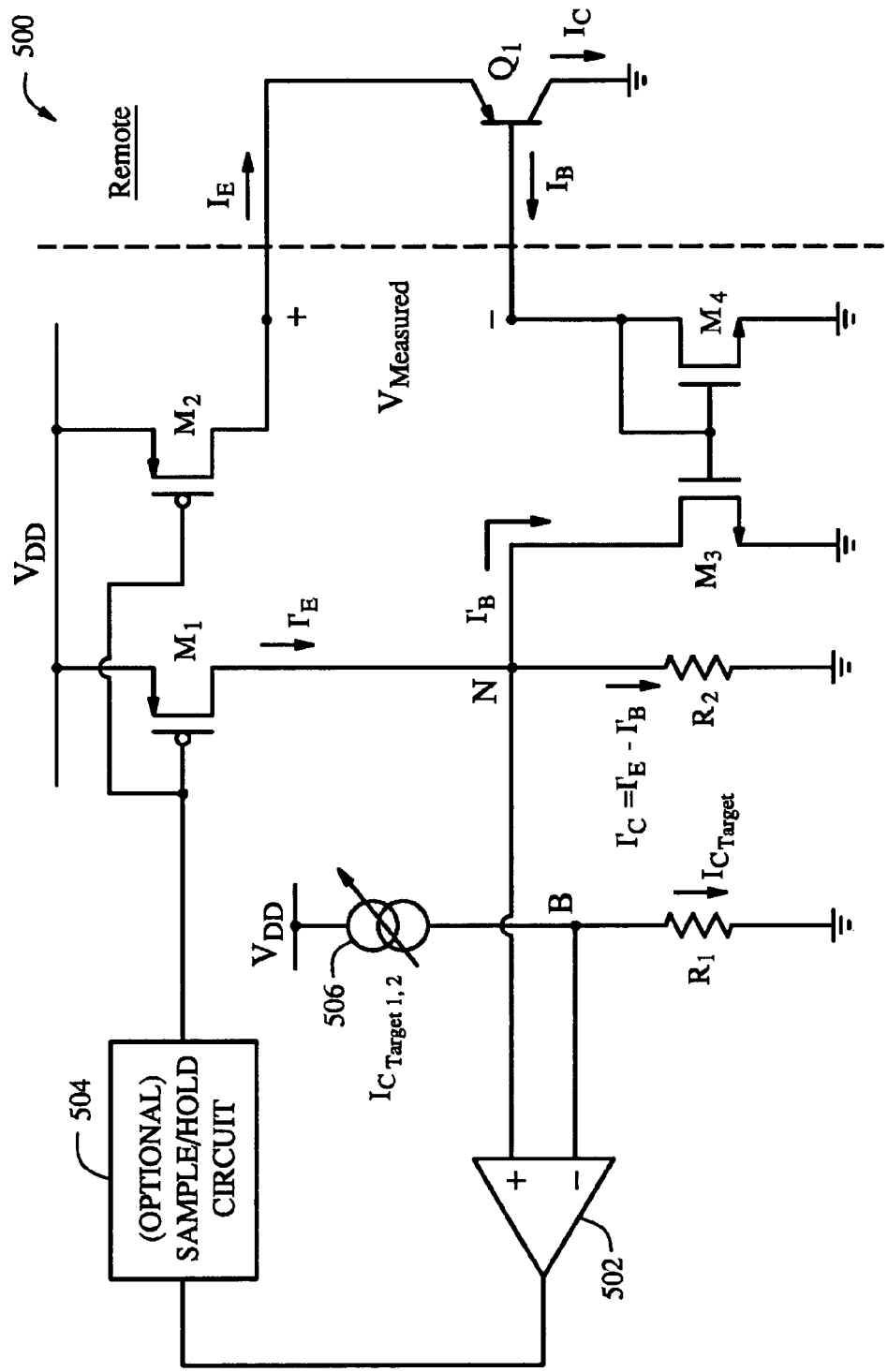
FIG. 5 illustrates a schematic diagram of an exemplary circuit that employs analog components to determine collector currents for a remotely located transistor.

FIG. 5 illustrates a schematic diagram of overview 500 for employing analog components to determine collector currents for a remotely located transistor Q1 in accordance with the process discussed above. A pair of substantially matched MOSFET transistors M1 and M2 have their sources coupled to a voltage supply (Vdd) and their gates coupled to an output of opamp 502. The drain of MOSFET M2 is coupled to the emitter of remotely located transistor Q1 and arranged to provide an emitter current (Ie). The drain of MOSFET M1 is similarly arranged to provide a relatively equivalent current (Ie') to a node "N", i.e., Ie'=Ie.

Node N is coupled to the non-inverting input of opamp 502, an end of resistor R2 (other end of resistor R2 is coupled to ground) and the drain of MOSFET M3. MOSFETs M4 and M3 are substantially matched to each other and configured in a current mirror arrangement where their sources are coupled to ground and their gates are coupled together. Further, the gate of MOSFET M4 is coupled to its drain and the base of remotely located transistor Q1 so that the base current Ib of transistor Q1 is mirrored by another current Ib' flowing through MOSFET M3, i.e., Ib=Ib'. Since the non-inverting input to opamp 502 has a relatively infinite impedance at Node N, the current (Ic') that flows through transistor R2 is equivalent to Ie'−Ib', which in turn is relatively equivalent to the collector current. One terminal of variable current source 506 is coupled to the voltage supply (Vdd) and another terminal of the variable current source is coupled at Node "B" to both an end of resistor 111 and the inverting input to opamp 502. The other end of resistor R1 is coupled to ground; and the impedance values of resistors R1 and R2 are relatively equivalent to each other. However, in another embodiment, the impedances of resistors R1 and R2 can be significantly different values so long as a ratio of their impedances is known, e.g., the impedance of R1 could be equivalent to several multiples of the impedance of R2, and vice versa.

Since the inverting input to opamp 502 has a relatively infinite impedance, a target collector current (Ictarget) provided by the variable current source flows primarily through resistor R1 to ground. Based on the difference in voltage drops at its non-inverting and inverting inputs caused by the flow of Ictarget through resistor R1 and the flow of Ic' through resistor R2, opamp 502 adjusts its output to drive the gates of MOSFETs M1 and M2 until these voltage drops are relatively equivalent, such that Ic'=Ictarget. Once Ic' is relatively equivalent to Ictarget, the base-emitter voltage (Vmeasured) for transistor Q1 is measured for a first target collector current. This process is repeated for a second target collector current and a second measurement of the base-emitter voltage for transistor Q1 is performed. Additionally, once Ic' is adjusted to be relatively equivalent to a target collector current (Ictarget), optional sample and hold circuit 504 enables the base-emitter voltage of transistor Q1 to be measured while at least opamp 502 is de-energized to conserve power and reduce noise. Furthermore, the diode equation can be employed to determine the temperature of transistor Q1 based on the two measurements of the base-emitter voltage for this transistor and a ratio of the two target collector currents (Ictarget1 and Ictarget2). Additionally, substantially the same arrangement of these components could be employed to determine the temperature of a transistor that is disposed locally, i.e., the transistor can be disposed in the same integrated circuit as the components employed to measure its currents.

Figure 6:
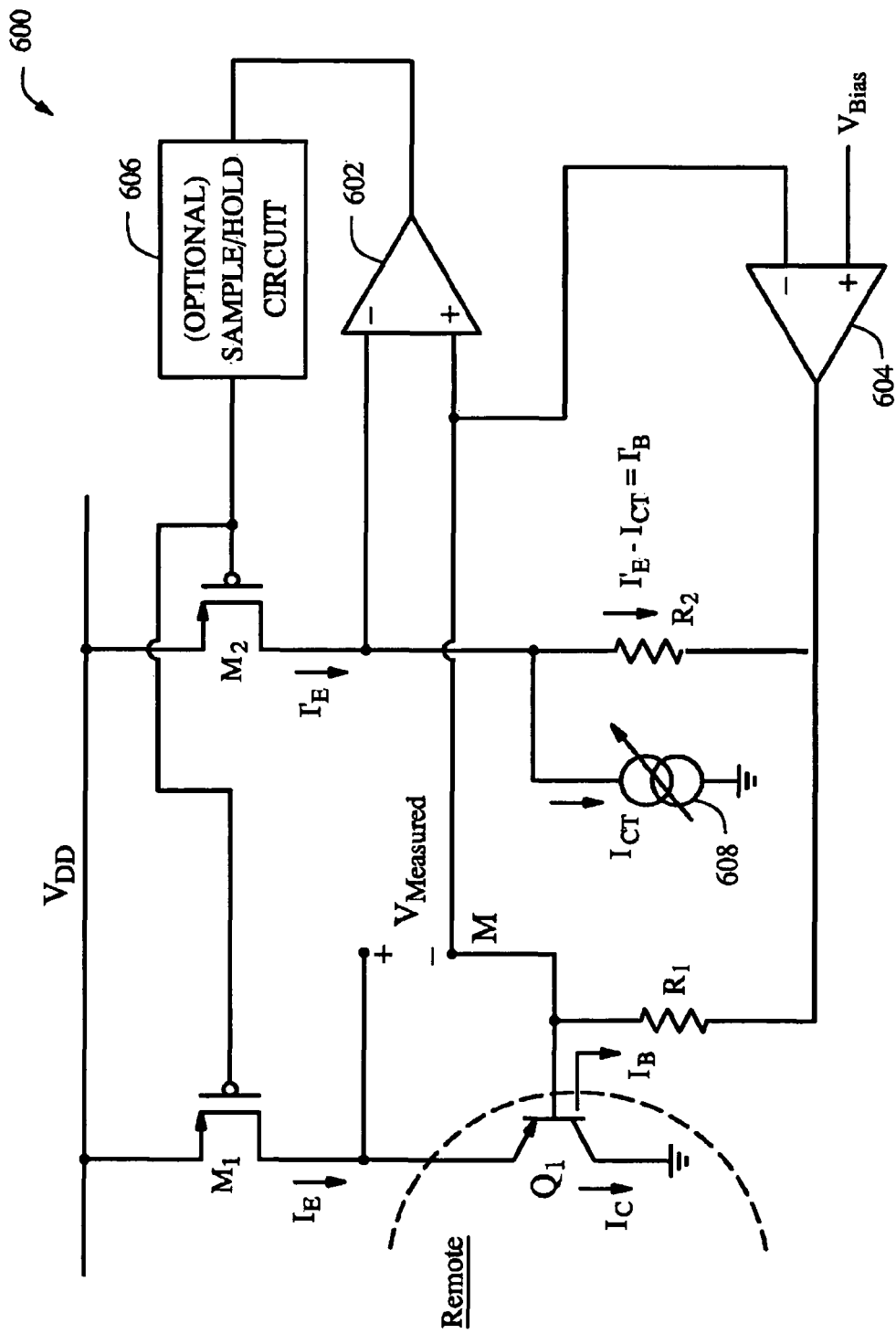
FIG. 6 illustrates a schematic diagram of an exemplary circuit that employs analog components to determine collector currents for a biased and remotely located transistor.

FIG. 6 illustrates a schematic diagram of overview 600 for employing analog components to determine collector currents for a biased and remotely located transistor Q1 in accordance with the process discussed above. The operation of this embodiment is similar in some ways to the embodiment discussed in FIG. 5, albeit different in other ways such as biasing. The sources of a pair of substantially matched MOSFET transistors M1 and M2 are coupled to a voltage supply (Vdd) and both of their gates are coupled to an output of opamp 602. The drain of MOSFET M1 is coupled to the emitter of remotely located transistor Q1 and arranged to provide an emitter current (Ie) to this transistor. The drain of MOSFET M2 is similarly arranged to provide a relatively equivalent current (Ie'=Ie) at one end of resistor R2 and the inverting input of opamp 602. This particular end of resistor R2 is also coupled to one terminal of variable current source 608 whose other terminal is coupled to ground. Also, the other end of resistor R2 is coupled to the output of bias opamp 604.

At Node M, the base of transistor Q1 is coupled to one end of resistor R1 whose other end is coupled to the output of bias opamp 604. Also, the base of transistor Q1 is coupled to the non-inverting input of opamp 602 and the inverting input of bias opamp 604. The impedance values for resistors R1 and R2 are substantially equivalent to each other. Also, a bias voltage Vbias is coupled to the non-inverting input of bias opamp 604.

In operation, Vbias is applied to the non-inverting input of bias opamp 604 to bias the operation of the listed components above the common mode voltage and MOSFET M1 provides the emitter current (Ie) to the remotely located transistor Q1 so that a base current (Ib) flows through resistor R1. A similar current (Ie') is provided by MOSFET M2 to the other components in the circuit such that variable current source 608 sinks a target collector current (Ictarget) and the current (Ib') flowing through resistor R2 is substantially equivalent to Ie'−Ictarget. The output of opamp 602 is adjusted until the base current (Ib) flowing through resistor R1 is relatively equivalent to the current (Ib') flowing through resistor R2 for the target collector current (Ictarget).

Additionally, the operation of bias opamp 604 ensures that the voltage at Node M (base of transistor Q1) is relatively equivalent to a predetermined bias voltage Vbias. Also, the operation of opamp 602 ensures that the collector current for the remotely located transistor Q1 is adjusted to the value of the target collector current.

Once Ib' is relatively equivalent to Ib, the base-emitter voltage (Vmeasured) for transistor Q1 is measured for a first target collector current. This process is repeated for a second target collector current and a second measurement of the base-emitter voltage for transistor Q1 is performed. Additionally, once Ib' is adjusted to be relatively equivalent to Ib for a given target collector current (Ictarget), optional sample and hold circuit 606 enables the base-emitter voltage of transistor Q1 to be measured while at least opamp 602 is de-energized to conserve power and to reduce noise. Furthermore, the diode equation can be employed to determine the temperature of transistor Q1 based on the two measurements of the base-emitter voltage for this transistor and a ratio of the two target collector currents (Ictarget 1 and Ictarget2). Additionally, substantially the same arrangement of these components could be employed to determine the temperature of a transistor that is disposed locally, i.e., the transistor can be disposed in the same integrated circuit as the components employed to measure its currents.

Figure 7:
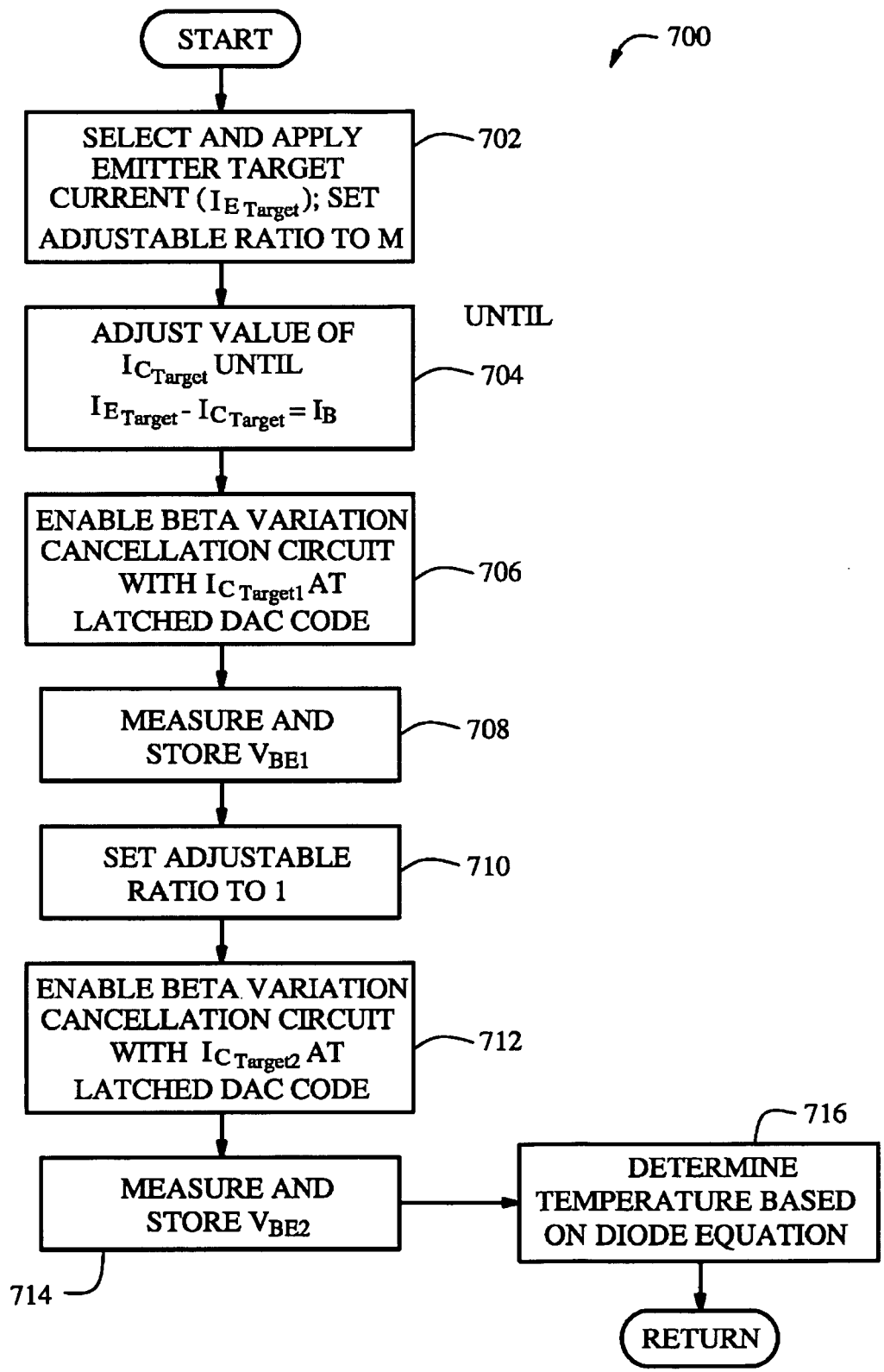
FIG. 7 illustrates a flow chart for determining two target collector currents that can be employed in the determination of the temperature for a remotely located transistor.

FIG. 7 illustrates a flow chart for determining two target collector currents that can be employed in the determination of the temperature for a remotely located transistor. Moving from a start block, the process steps to block 702 where a target emitter current is selected and applied to the remotely located transistor and other components employed to measure at least one of this transistor's collector and base currents. Also, an adjustable ratio of one MOSFET transistor in a current mirror that provides a target collector current is set equal to M where M is equivalent to a ratio of a first target collector current over a second target collector current. In one embodiment, M is set equal to 16.

At block 704, the process adjusts the value of the target collector current until the target emitter current minus the target collector current is equivalent to the base current of the remotely located transistor. Also, the code for a Digital to Analog Converter (DAC) that enables the adjustment of the target collector current is set equal to zero; and the DAC code is incremented until a comparator changes state and indicates that the base current of the remotely located transistor is equivalent to the target emitter current minus the target collector current. This incremented DAC code is latched at the state change of the comparator.

Moving to block 706, the process enables an exemplary beta variation cancellation circuit with a first target collector current that is equivalent to the Ictarget at the latched DAC code. Exemplary beta variation cancellation circuits and their operation are taught in FIGS. 2, 4-6, and 8-9 and the related discussion. At block 708, the base-emitter voltage Vbe1 for the first target collector current (Ictarget1) is measured and stored.

Advancing to block 710, the process changes the adjustable ratio from M to one for the one MOSFET transistor in the current mirror that provides the target collector current so that the second target collector current is substantially smaller than the first target collector current. At block 712, the process enables an exemplary beta variation cancellation circuit with a second target collector current that is equivalent to the Ictarget at the second latched DAC code. At block 714, the base-emitter voltage Vbe2 for the second target collector current (Ictarget2) is measured and stored. Next, the process steps to block 716 where the diode equation is employed to determine the temperature of the remotely located transistor. The process subsequently returns to performing other actions. Additionally, substantially this same process could be employed to determine the temperature of a transistor that is disposed locally, i.e., the transistor can be disposed in the same integrated circuit as the components employed to measure its currents.

Figure 8:
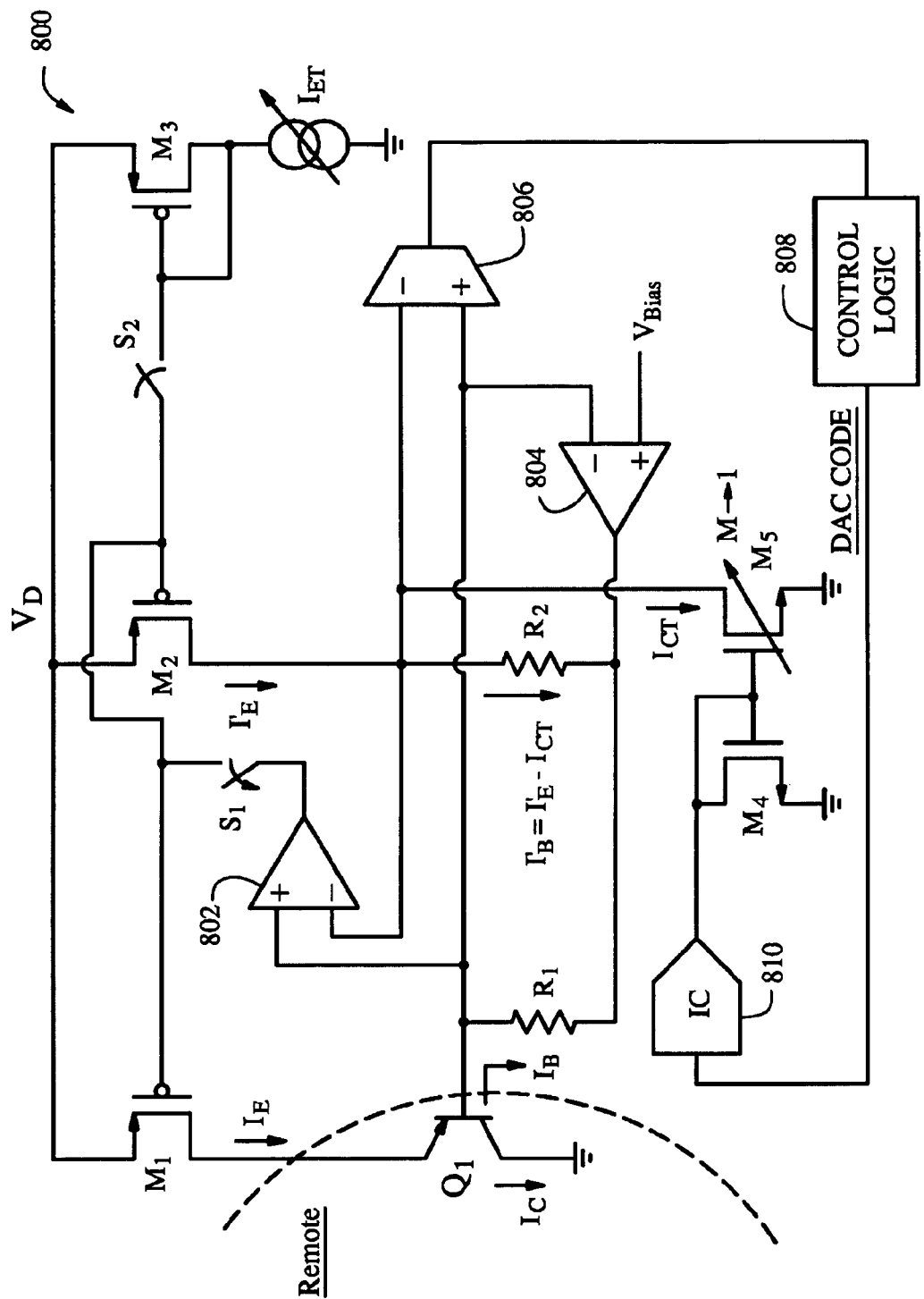
FIG. 8 shows a schematic diagram of an exemplary circuit for determining a first and a second target collector current for the process described for FIG. 7.

FIG. 8 shows a schematic diagram of overview 800 for determining a first and a second target collector current in a manner substantially similar to the process described for FIG. 7. Also, the arrangement and operation of the electronic circuit shown in FIG. 8 is substantially similar to the electronic circuit shown in FIG. 6, albeit different in some ways. In particular, FIG. 8 teaches enabling the first and second target collector currents to be determined based on a selected target emitter current and an adjustable ratio for a variable current mirror prior to measuring the base-emitter voltage for the remotely located transistor. The variable current mirror provides the target collector currents and is formed by the arrangement of MOSFET transistors M4 and M5 where the impedance of M5 is adjustable.

Additionally, the inputs to comparator 806 are coupled to the inverting inputs of bias opamp 804 and opamp 802. The output of the comparator is coupled to control logic 808 which outputs a code for DAC 810. The output of the DAC is coupled to the gates of the MOSFETs M4 and M5. Also, MOSFET M3 is configured to provide a target emitter current and operate as another current mirror with MOSFET transistors M1 and M2. This other current mirror ensures that the target emitter current (Ietarget) flowing through MOSFET M3 is substantially equivalent to the currents flowing through MOSFETS M1 (Ie) and M2 (Ie').

During the determination of the first and second target collector currents, the output of opamp 802 may be disconnected from the gates of MOSFETs M1 and M2 by the opening of analog switch S1. Also during this determination, MOSFET M3 is connected to the gates of MOSFETs M2 and M1 by the closing of analog switch S2. After the first and second target collector currents are determined, S1 closes and connects the output of opamp 802 to the gates of MOSFETs M1 and M2; and S2 opens and disconnects MOSFET M3 from the gates of MOSFETs M1 and M2.

Although not shown, a sample and hold circuit could also be provided that disconnects the output of opamp 802 from the circuit during the determination of target collector currents and the measurement of the base-emitter voltage for the remotely located transistor. Additionally, substantially the same arrangement of these components could be employed to determine the temperature of a transistor that is disposed locally, i.e., the transistor can be disposed in the same integrated circuit as the components employed to measure its currents.

Figure 9:
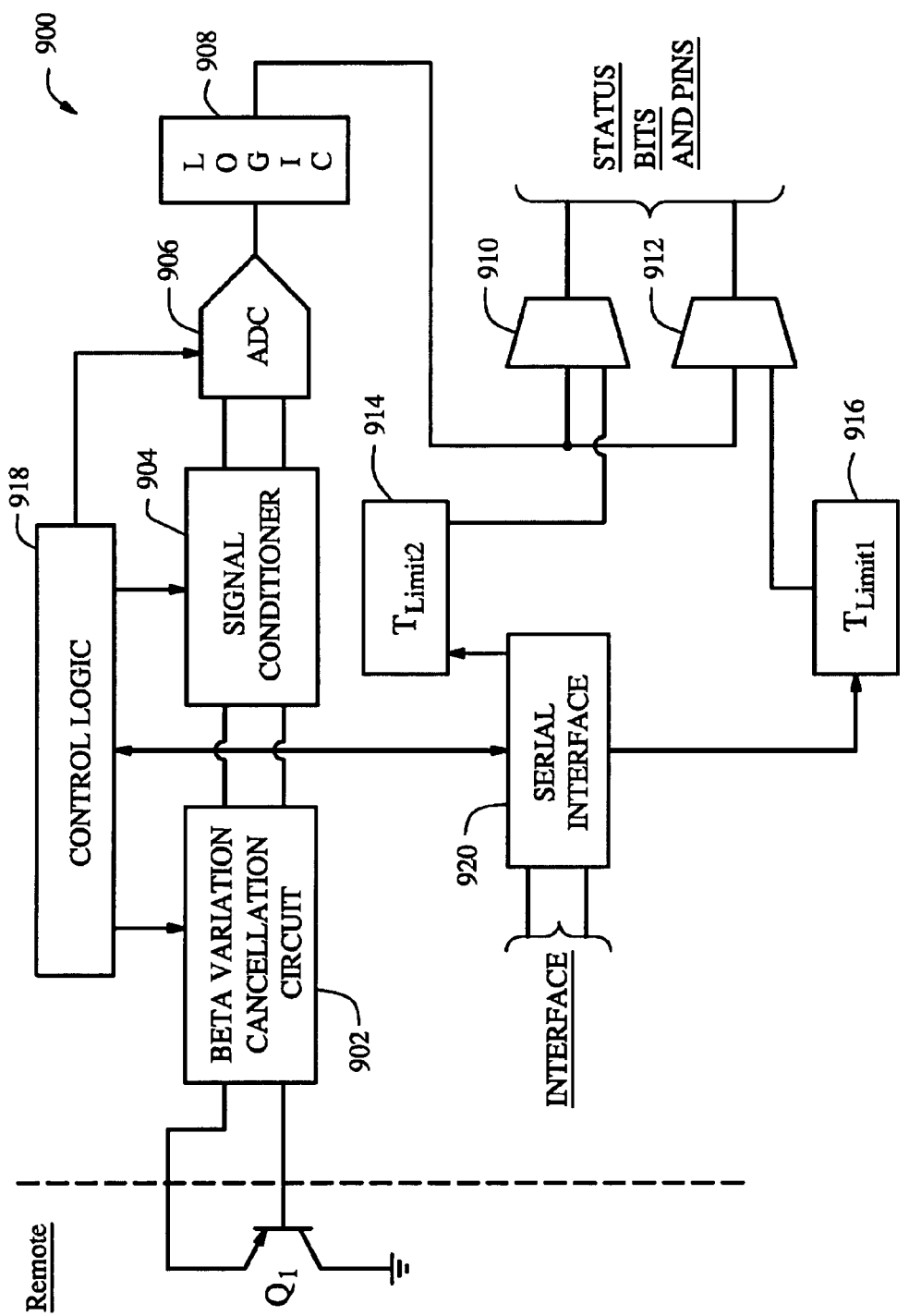
FIG. 9 illustrates an overview of a block diagram for components that measure the temperature of remotely located transistor in accordance with determined target collector currents and base-emitter voltages for the transistor.

FIG. 9 illustrates an overview of block diagram 900 for components to measure the temperature of remotely located transistor Q1 by determining target collector currents and base-emitter voltages for the transistor. In another integrated circuit, the remotely located transistor's base and emitter currents are coupled to beta variation cancellation circuit 902 (exemplary embodiments are discussed above). The analog signal output of circuit 902 is coupled to signal conditioner 904 which can include buffers, low pass filters, and the like, for damping/removing noise. The output of signal conditioner 904 is coupled to the inputs of analog to digital converter (DAC) 906 whose output is coupled to logic component 908.

The output of logic component 908 is coupled to one of the inputs for comparators 910 and 912. The output of these comparators can be provided as external status bits and/or pins for the integrated circuit. Another input to comparator 910 is coupled to an output of Temperature Limit2 (914). Also, the other input to comparator 912 is coupled to an output of Temperature Limit1 (916). Serial interface 920 is coupled to both of the temperature limits (914 and 916) and control logic 918. This control logic is also coupled to circuit 902, signal conditioner 904 and ADC 906.

Additionally, serial interface 920 is arranged so that an interface external to the integrated circuit can be employed to configure the operation of the control logic and the values of the two temperature limits (914 and 916). The serial interface can also be configured to provide a digitized value that represents a relatively accurate temperature of the remotely located transistor. Furthermore, substantially the same arrangement of these components could be employed to determine the temperature of a transistor that is disposed locally, i.e., the transistor can be disposed in the same integrated circuit as the components employed to measure its currents.

Figure 10:
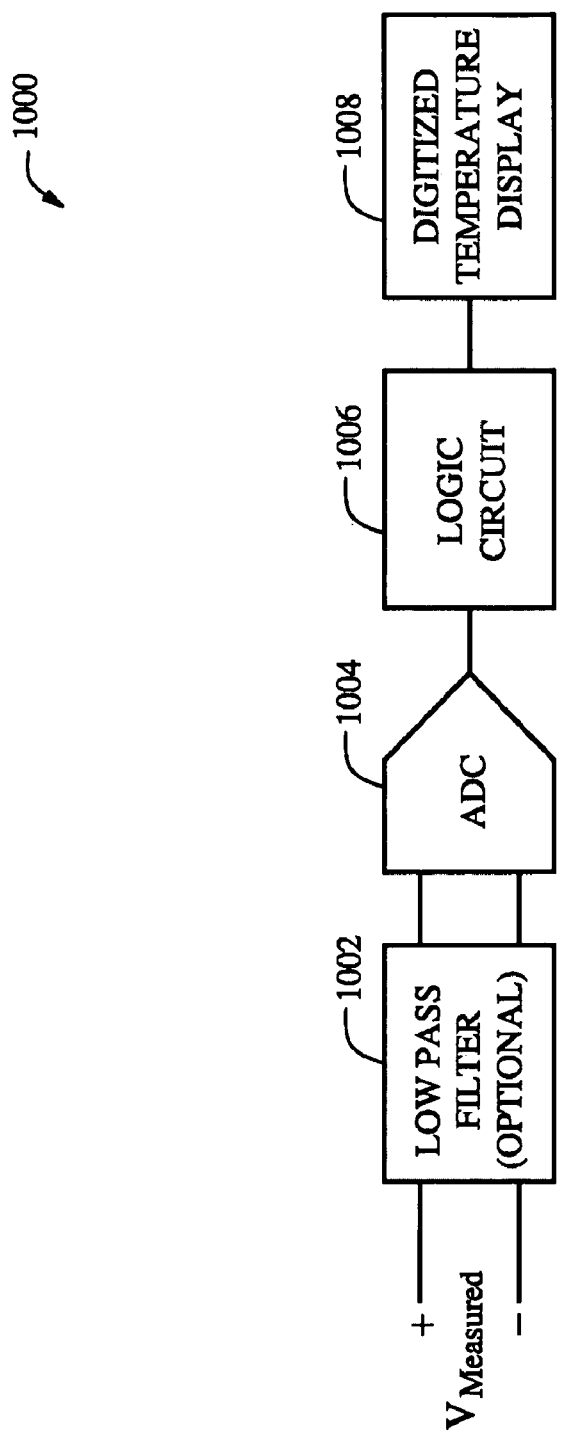
FIG. 10 illustrates a block diagram for an exemplary circuit for measuring the base-emitter voltage of a remotely located transistor in accordance with the invention.

FIG. 10 illustrates a block diagram of overview 1000 for an exemplary circuit for measuring the base-emitter voltage (Vmeasured) of a remotely located transistor. The Vmeasured is coupled to optional low pass filter 1002 which provides for reducing/eliminating noise in the measured voltage. The outputs of filter 1002 is coupled to the inputs of analog to digital converter (ADC) 1004 whose output is coupled to logic circuit 1006. The logic circuit converts the digitized measurement of the base-emitter voltage into a format that can be displayed by digitized temperature display 1008. Display 1008 can include numerical displays, colors, pictures, graphics, bar graphs, sounds, status bits, status pins, interfaces, and the like, as a representation of the digitized temperature for the remotely located transistor.

Additionally, in another embodiment, where the remotely located transistor is disposed in series with and/or accessed through one or more resistors, a resistive cancellation circuit may be provided in addition to the circuits discussed above. If these resistive cancellation circuits are used, likely more than two measurements of the base currents and/or base-emitter voltages may be performed to accurately determine the temperature of the resistor.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the

What is claimed as new and desired to be protected by Letters Patent of the United States is:

1. Apparatus for use in measuring a temperature of a bipolar measurement transistor comprising:
   emitter current control circuitry having an output to be coupled to an emitter electrode of the measurement transistor, said emitter control circuitry being configured to adjust an emitter current to the measurement transistor in response to a state of at least one emitter current control signal;
   collector current select circuitry configured to produce a first state of the at least one emitter current control signal, with the measurement transistor emitter current resulting in a measurement transistor first collector current and to then produce a second state of the at least one emitter current control signal, with the measurement transistor emitter current resulting in a measurement transistor second collector current; and
   beta compensation circuitry having an input to be coupled to a base electrode of the measurement transistor and configured to cause the respective magnitudes of the measurement transistor first and second collector currents to have a known ratio N, with N being other than one.

2. The apparatus of claim 1 further including voltage apparatus to be coupled to the emitter and base electrodes of the measurement transistor to provide a voltage measurement indicative of a base-emitter voltage of the measurement transistor.

3. The apparatus of claim 1 further including temperature output apparatus for providing a temperature measurement based, at least in part, upon a difference in the base-emitter voltages which results from a difference in magnitude of the first and second measurement transistor collector currents and upon the ratio N.

4. The apparatus of claim 1 wherein the first state of the at least one emitter current control signal is produced by the collector current select circuitry independent of a base current of the measurement transistor.

5. The apparatus of claim 4 wherein the second state of the at least one emitter current control signal is produced by the collector current select circuitry independent of the base current of the measurement transistor.

6. The apparatus of claim 5 wherein the emitter current control circuitry includes a current source circuit having a current output of at least first and second differing fixed current magnitudes, with current output of the first and second magnitudes being selectively provided to the measurement transistor in response to respective first and second sates of the at least one emitter current control signal.

7. The apparatus of claim 6 wherein the current source circuit includes at least two current sources and a multiplexer circuit having input coupled to the outputs of the at least two current sources, with the multiplexer circuit being controlled by the at least one emitter current control signal.

8. The apparatus of claim 5 wherein the beta compensation circuitry includes analog-to-digital converter circuitry which produces digital representations of the measurement transistor base current and further includes digital circuitry which receives the digital representations, with the digital circuitry operating to determine the ratio N.

9. The apparatus of claim 8 wherein the digital circuitry determines the ratio N utilizing the digital representations of the measurement transistor base currents together with data representing the measurement transistor emitter currents.

10. The apparatus of claim 1 wherein the beta compensation circuitry includes target signal generation circuitry configured to produce first and second target signals having a magnitude ratio of M, with M being utilized by the beta compensation circuitry to establish the ratio N.

11. The apparatus of claim 10 where M is equal to N.

12. The apparatus of claim 10 wherein the emitter current control circuitry includes a first transistor that conducts at least part of the adjustable emitter current to the measurement transistor and wherein the apparatus further includes a second transistor, with the first and second transistors having respective control electrodes coupled in common.

13. The apparatus of claim 12 wherein the first transistor of the emitter current control circuitry conducts substantially all of the measurement transistor emitter current when the measurement transistor is coupled to the apparatus.

14. The apparatus of claim 10 wherein the target signal generation circuitry includes a signal multiplier and target controller, with the target controller being configured to produce a multiplier input value to the signal multiplier, with the signal multiplier being configured to multiply the multiplier input value so a to provide the first and second target signals having a magnitude ratio of the value M.

15. The apparatus of claim 14 wherein the signal multiplier includes an adjustable current mirror circuit switchable between a first state where an input current is multiplied by a first value and a second state where an input current is multiplied by a second value M times larger than the first value.

16. The apparatus of claim 15 wherein target controller is configured to derive the multiplier input value at least in part from emitter current signals indicative of the measurement transistor emitter current, with the first and second target signals being produced based upon a common multiplier input value.

17. The apparatus of claim 16 wherein the target controller includes digital circuitry which provides the multiplier input value in digital form and conversion circuitry which converts the multiplier input value from digital form to analog form, with the analog form of the multiplier input value being provided to the signal multiplier.

18. The apparatus of claim 17 wherein the beta compensation circuitry utilizes a feedback loop to control the measurement transistor emitter current and wherein the feedback loop is momentarily disabled when the common multiplier input value is derived by the target controller.

19. The apparatus of claim 18 wherein the emitter current control circuitry includes a first transistor that conducts the adjustable emitter current to the measurement transistor and wherein the beta compensation circuitry includes a second transistor, with the first and second transistors having respective control electrodes coupled in common and wherein the emitter current signals indicative of measurement transistor emitter current are produced by the second transistor.

20. The apparatus of claim 19 wherein the target controller includes a third transistor having a control electrode coupled to the common control electrodes of the first and second transistors, with current flow through the third transistor controlling current flow through the first and second transistors when the feedback loop is momentarily disabled.

21. The apparatus of claim 20 wherein the control electrode of the third transistor coupled to the common control electrodes of the first and second transistors only when the feedback loop is momentarily disabled.

22. The apparatus of claim 10 wherein the beta compensation circuitry produces base current signals indicative of the measurement transistor base currents and wherein the collector current select circuitry includes comparison circuitry for comparing first and second comparison signals, with one or both of the first and second comparison signals being derived from a combination of the first and second target signals and the base current signals, with the collector current select circuitry producing the first state of the at least one emitter current control signal when the combination includes the first target signal and producing the second state of the at least one emitter current control signal when the combination include the second target signal.

23. The apparatus of claim 22 wherein the first comparison signal is derived from either the first or the second target signals and the second comparison signal is derived from the base current signals.

24. The apparatus of claim 22 wherein the combination of signals further includes a signal indicative of measurement transistor emitter current when the apparatus is coupled to the measurement transistor.

25. The apparatus of claim 22 wherein the first comparison signal is derived from either the first or the second target signals in combination with emitter current signals indicative of the measurement transistor emitter current when the apparatus is coupled to the measurement transistor and wherein the first state of the at least one emitter current control signal is produced when the first comparison signal is derived from the first target signal and the second state of the emitter current control signal is produced when the first comparison signal is derived from the second target signal.

26. The apparatus of claim 25 wherein the second comparison signal is produced at the input of the beta compensation circuit to be coupled to the measurement transistor base electrode.

27. The apparatus of claim 26 wherein the beta compensation circuitry further includes biasing circuitry configured to bias the beta compensation circuit input at a bias voltage which is relatively independent of the measurement transistor base current when the measurement transistor is coupled to the apparatus.

28. The apparatus of claim 27 wherein comparison circuitry has an associated common mode operating voltage below the bias voltage in magnitude.

29. The apparatus of claim 28 wherein the second comparison signal is produced, in part, by generating a first voltage indicative the measurement transistor base current and imposing the first voltage across a first impedance so as to produce base current signal.

30. The apparatus of claim 29 wherein the first voltage is imposed across the first impedance by way of feedback provided by the comparison circuitry.

31. The apparatus of claim 30 wherein the first voltage is generated by passing a current relating to the measurement transistor base current, when the apparatus is coupled to the measurement transistor, through a second impedance and wherein the feedback provided by the comparison circuitry functions to equalize voltages across the first and second impedances.

32. The apparatus of claim 31 wherein the first and second target signals and the emitter current signal are coupled to a first node of the first impedance.

33. The apparatus of claim 32 wherein a first node of the second impedance is coupled to the input of the beta compensation circuitry.

34. The apparatus of claim 33 wherein each of the first and second impedances includes a second node opposite the respective first nodes, with the second nodes of the first and second impedances being coupled together and wherein the first comparison signal is present on the first node of the first impedance.

35. The apparatus of claim 32 wherein the emitter current control circuitry includes a first transistor that conducts the adjustable emitter current to the measurement transistor and wherein the beta compensation circuitry includes a second transistor, with the first and second transistors having respective control electrodes coupled in common and wherein the emitter current signals indicative of measurement transistor emitter current are produced by the second transistor.

36. The apparatus of claim 35 wherein the output of the comparison circuitry is coupled to the common control electrodes of the first and second transistors to provide the feedback action.

37. The apparatus of claim 22 wherein the emitter current control circuitry includes a first transistor that conducts the adjustable emitter current to the measurement transistor and wherein the beta compensation circuitry includes a second transistor, with the first and second transistors having respective control electrodes coupled in common and wherein the signal indicative of measurement transistor emitter current is produced by the second transistor when the apparatus is coupled to the measurement transistor.

38. The apparatus of claim 37 wherein the beta compensation circuitry includes a current mirror circuit having an input to be coupled to the base electrode of the measurement transistor and an output which provides the base current signals.

39. The apparatus of claim 37 wherein an output of the comparison circuitry is coupled to the common control electrodes of the first and second transistors.

40. The apparatus of claim 39 further including a sample-and-hold circuit configured to couple the output of the comparison circuitry to the common control electrodes.

41. Apparatus for use in measuring a temperature of a bi-polar measurement transistor, said apparatus comprising:
    emitter current control circuitry having an output to be coupled to an emitter electrode of the measurement transistor, said emitter current control circuitry being configured to provide a first emitter current component to the measurement transistor in response to at least a first emitter current control signal and a second emitter current component to the measurement transistor in response to at least a second emitter current control signal and wherein the first and second emitter current components each form at least a portion of the measurement transistor emitter current;
    collector current select circuitry configured to provide the at least a first emitter current control signal that results in a first collector current in the measurement transistor and to then provide the at least a second emitter current control signal that results in a second collector current in the measurement transistor; and
    beta compensation circuitry having an input to be coupled to a base electrode of the measurement transistor and configured to cause the collector current select circuitry adjust the at least a first emitter current control signal so as to produce the first and second measurement transistor collector currents having respective magnitudes with a ratio N, with N being other than one and with N being substantially independent of any variation in measurement transistor current gain.

42. The apparatus of claim 41 further including voltage apparatus to be coupled to the emitter and base electrodes of the measurement transistor to provide a base-emitter measurement indicative of a base-emitter voltage of the measurement transistor.

43. The apparatus of claim 41 wherein the beta compensation circuitry is further configured to cause the collector current select circuitry to adjust the at least a second emitter current control signal so as to produce the first and second measurement transistors with the ratio N.

44. The apparatus of claim 43 further including temperature output apparatus for providing a temperature measurement based, at least in part, upon a difference in base-emitter voltage which results when the measurement transistor collector current switches between the first and second collector currents and based, at least in part, on the ratio N.

45. The apparatus of claim 43 wherein beta compensation circuitry forms part of a feedback loop which includes the base and emitter electrodes of the measurement transistor when the apparatus is coupled to the measurement transistor.

46. The apparatus of claim 45 wherein the emitter current control circuitry includes a first transistor which conducts at least part of the measurement transistor emitter current when the apparatus is coupled to the measurement transistor and wherein a control electrode of the first transistor is present in the feedback loop.

47. The apparatus of claim 43 wherein the beta compensation circuitry produces at least a first target signal utilized to produce at least one of the first and second measurement transistor collector currents having the ratio N.

48. The apparatus of claim 47 wherein the first target signal has a magnitude based upon at least a base current of the measurement transistor.

49. The apparatus of claim 48 wherein the first target signal has a magnitude based upon a current gain of the measurement transistor.

50. The apparatus of claim 43 wherein the beta compensation circuitry produces first and second target signals having a magnitude ratio of M, with the first and second target signals being used by the beta compensation circuitry to establish the ratio N.

51. The apparatus of claim 50 wherein M is equal to N.

52. The apparatus of claim 50 wherein the beta compensation circuitry utilizes the first and second target signals to cause the collector current select circuitry to produce the respective first and second emitter current control signals.

53. The apparatus of claim 50 wherein the beta compensation circuitry includes target signal generation circuitry configured to produce the first and second target signals, with the first and second target signal being adjustable in magnitude thereby causing the first of the first and second measurement transistor collector currents, while having respective magnitudes of ratio N, to also be adjustable in magnitude.

54. The apparatus of claim 53 wherein the target signal generation circuitry is further configured to momentarily cause the emitter current control circuitry to provide a third emitter current component to the measurement transistor in lieu of the first and second variable emitter current components when the apparatus is coupled to the measurement transistor.

55. The apparatus of claim 54 wherein the emitter current control circuitry includes a first transistor and the beta compensation circuitry includes a second transistor and wherein the target signal generation circuitry includes a third transistor, with control electrodes of the first and second transistor coupled in common and wherein, when the measurement transistor is coupled to the apparatus, the first transistor conducts the first, second and third emitter current components, the second transistor produces an emitter current signal indicative of emitter current in the measurement transistor and wherein the third transistor conducts a current that corresponds to the third emitter current component, with a control electrode of the third transistor being at least momentarily coupled to the common electrodes of the first and second transistors so that the first transistor conducts the third emitter current component.

56. The apparatus of claim 55 wherein the beta compensation circuitry provides part of a feedback loop that controls the first and second emitter current components when the apparatus is coupled to the measurement transistor and wherein the feedback loop is momentarily interrupted when the first transistor conducts the third emitter current component.

57. The apparatus of claim 54 wherein the target signal generation circuitry is configured to produce the first target signal based upon a difference between the measurement transistor emitter current and measurement transistor base current when the emitter current control circuitry momentarily provides the third emitter current component to the measurement transistor.

58. The apparatus of claim 57 target signal generation circuitry includes a storage element configured to store a target current value that is used to produce the first and second target signals and a multiplier element that multiplies the target current value in order to produce at least the second target signal.

59. The apparatus of claim 58 wherein the multiplier element includes a current mirror circuit having an input current that corresponds to the target current value, a first output current that corresponds to the first target signal and a second output current that corresponds to the second target signal.

60. The apparatus of claim 58 wherein the storage element stores the target current value in digital form.

61. The apparatus of claim 60 wherein the target signal generation circuitry includes a digital-to-analog converter having a digital input that receives the target current value in digital form and an analog output coupled to an input of the multiplier element.

62. The apparatus of claim 58 wherein the multiplier element operates to multiply the target current value by M1 to produce the first target signal and operates to multiply the target current value by M2 to produce the second target signal and wherein values M1 and M2 have a ratio of N.

63. The apparatus of claim 62 wherein the value M1 is one and the value M2 is N.

64. The apparatus of claim 50 further including a second transistor having a control electrode coupled to the control electrode of the first transistor.

65. The apparatus of claim 64 wherein the beta compensation circuitry further utilizes a base current signal indicative of a base current of the measurement transistor when the apparatus is coupled to the measurement transistor, in combination with the first and second target signals to cause the collector current select circuitry to produce the respective first and second emitter current control signals.

66. The apparatus of claim 65 wherein the beta compensation circuitry includes a current mirror input transistor that functions as the input transistor of a current mirror circuit, with the current mirror input transistor configured to conduct at least the base current of the measurement transistor when the measurement transistor base and emitter electrodes are coupled to the apparatus.

67. The apparatus of claim 66 wherein the current mirror circuit further includes an output transistor having a control electrode coupled to a control electrode of the input transistor and wherein the output transistor forms part of the beta compensation circuitry and provides the base current signal.

68. The apparatus of claim 66 wherein the second transistor forms part of the beta compensation circuitry, wherein the first transistor conducts measurement transistor emitter current when the apparatus is coupled to the measurement transistor, wherein the second transistor provides an emitter current signal indicative of emitter current in the measurement transistor and wherein the beta compensation circuitry produces first and second comparison signals derived from the first and second target signals, the base current signal and the emitter current signal and wherein the collector current select circuitry includes comparison circuitry configured to compare the first and second comparison signals and to produce the at least a first and second emitter current control signals in response to the comparison.

69. The apparatus of claim 68 wherein the at least a first and second emitter current control signals are coupled to the common control electrodes of the first and second transistors.

70. The apparatus of claim 69 further including a sample-and-hold circuit connected to couple the at least a first and second emitter current control signals to the common control electrodes of the first and second transistors.

71. The apparatus of claim 69 wherein the first comparison signal is derived from either the first or the second target signals and wherein the second comparison signal is derived from an emitter current signal and a base current signal indicative of the respective emitter and base currents of the measurement transistor when the measurement transistor is coupled to the apparatus and wherein the at least a first emitter current control signal is produced when the first comparison signal is derived from the first target signal and the wherein the at least a second emitter current control signal is produced when the first comparison signal is derived from the second target signal.

72. The apparatus of claim 65 wherein the beta compensation circuitry produces first comparison signals derived from the first and second target signals, an emitter current signal indicative of measurement transistor emitter current when the measurement transistor is coupled to the apparatus and a base current signal indicative of measurement transistor base current when the measurement transistor is coupled to the apparatus and wherein the collector current select circuitry further includes comparison circuitry for comparing the first and second comparison signals and producing the at least a first and second emitter current control signals in response to the comparison.

73. The apparatus of claim 72 wherein the first comparison signal is derived from either the first or the second target signals and wherein the second comparison signal is derived from the emitter and base current signals and wherein the at least a first emitter current control signal is produced when the first comparison signal is derived from the first target signal and wherein the at least a second emitter current control signal is produced when the first comparison signal is derived from the second target signal.

74. The apparatus of claim 73 wherein the second comparison signal is derived by passing a first current representing a difference between the emitter current signal and the base current signal through a first impedance.

75. The apparatus of claim 74 wherein the first comparison signal is derived by passing a second current representing the first target signal through a second impedance and by passing a third current representing the second target signal through the second impedance.

76. The apparatus of claim 73 wherein the second transistor forms part of the beta compensation circuitry and the second transistor produces the emitter current signal.

77. The apparatus of claim 76 wherein the beta compensation circuitry includes a current mirror circuit having a current mirror input to be coupled to the base electrode of the measurement transistor and a current mirror output that provides the base current signal.

78. The apparatus of claim 72 wherein the first comparison signal is derived from the either the first or second target signals in combination with the emitter current signal and the base current signal and wherein the at least a first emitter current control signal is produced when the first comparison signal is derived from the first target signal and wherein the at least a second emitter current control signal is produced when the first comparison signal is derived from the second target signal.

79. The apparatus of claim 78 wherein the second comparison signal is relatively fixed in magnitude with respect to changes in the measurement transistor base current when the measurement transistor is coupled to the apparatus.

80. The apparatus of claim 79 wherein the second transistor forms part of the beta compensation circuitry and wherein the second transistor produces the emitter current signal.

81. The apparatus of claim 79 wherein the comparison circuitry has an associated common mode voltage when operating, wherein the second comparison signal is present at a first node and wherein the beta compensation circuitry includes biasing circuitry for maintaining a voltage at the first node above the common mode voltage.

82. The apparatus of claim 81 wherein the base electrode of the measurement transistor is coupled to the first node when the measurement transistor is coupled to the apparatus.

83. The apparatus of claim 82 wherein the biasing circuitry includes second comparison circuitry having a first input coupled to the first node and a second input coupled to a voltage source having a voltage output above the common mode voltage.

* * * * *